US010008236B2

(12) United States Patent
Nakata et al.

(10) Patent No.: US 10,008,236 B2
(45) Date of Patent: Jun. 26, 2018

(54) OPTICAL DISK, OPTICAL DISK RECORDING DEVICE, AND OPTICAL DISK PLAYBACK DEVICE

(71) Applicant: Panasonic Intellectual Property Management Co., Ltd., Osaka (JP)

(72) Inventors: Kohei Nakata, Nara (JP); Harumitsu Miyashita, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/652,787

(22) Filed: Jul. 18, 2017

(65) Prior Publication Data

US 2018/0047424 A1 Feb. 15, 2018

(30) Foreign Application Priority Data

Aug. 10, 2016 (JP) .................................. 2016-157729

(51) Int. Cl.
G11B 7/24 (2013.01)
G11B 20/12 (2006.01)

(52) U.S. Cl.
CPC .... G11B 20/1217 (2013.01); *G11B 2020/122* (2013.01); *G11B 2020/1278* (2013.01)

(58) Field of Classification Search
None
See application file for complete search history.

(56) References Cited

U.S. PATENT DOCUMENTS

| 5,410,522 | A | | 4/1995 | Yokota et al. | |
|---|---|---|---|---|---|
| 5,452,279 | A | | 9/1995 | Yokota et al. | |
| 5,561,530 | A | * | 10/1996 | Kanazawa | G11B 5/02 360/27 |
| 5,760,985 | A | * | 6/1998 | Kubo | G11B 5/024 360/66 |
| 2004/0032809 | A1 | * | 2/2004 | Ogihara | G11B 7/005 369/59.17 |
| 2005/0013218 | A1 | * | 1/2005 | Lee | G11B 5/78 369/47.21 |
| 2006/0077883 | A1 | * | 4/2006 | Ando | G11B 20/1883 369/275.3 |
| 2006/0153035 | A1 | * | 7/2006 | Eguchi | G11B 7/00736 369/47.53 |
| 2007/0025234 | A1 | * | 2/2007 | Takazawa | G11B 7/00736 369/275.5 |

(Continued)

FOREIGN PATENT DOCUMENTS

| JP | 5-266484 | 10/1993 |
|---|---|---|
| JP | 6-84276 | 3/1994 |

(Continued)

*Primary Examiner* — Peter Vincent Agustin
(74) *Attorney, Agent, or Firm* — Wenderoth, Lind & Ponack, L.L.P.

(57) ABSTRACT

An optical disk includes a disk management information area in which predetermined information is recorded in advance, and a recording system area in which information for identifying a recording system of the optical disk recorded in a predetermined position within a non-data area included in a recordable area is recorded. A method for accessing the optical disk is decided based on disk management information and the information for identifying a recording system.

8 Claims, 5 Drawing Sheets

(56) References Cited

U.S. PATENT DOCUMENTS

| | | | |
|---|---|---|---|
| 2007/0206449 A1* | 9/2007 | Aoyama | G11B 7/00736 369/13.55 |
| 2007/0253306 A1* | 11/2007 | Takahashi | G11B 7/00736 369/94 |
| 2009/0154315 A1 | 6/2009 | Miyashita et al. | |
| 2009/0207721 A1* | 8/2009 | Nakatani | G11B 7/0045 369/275.3 |
| 2010/0232270 A1* | 9/2010 | Nakamura | G11B 7/00736 369/47.15 |
| 2014/0160908 A1 | 6/2014 | Hino et al. | |

FOREIGN PATENT DOCUMENTS

| | | |
|---|---|---|
| WO | 2009/072287 | 6/2009 |
| WO | 2013/140756 | 9/2013 |

* cited by examiner

FIG. 1

OPTICAL DISK, OPTICAL DISK RECORDING DEVICE, AND OPTICAL DISK PLAYBACK DEVICE

BACKGROUND

1. Technical Field

The present disclosure relates to an optical disk on which data is optically recorded and a device for recording and playing back data on and from the optical disk.

2. Description of the Related Art

Techniques that improve recording density per volume in optical disks include a land (inter-groove)-groove recording and playback technique that is capable of improving recording density of tracks. Although data has been conventionally recorded only on a groove or a land, this technique, which has been already used in a DVD-RAM, records data on both a groove and a land to improve recording density of a track.

In the DVD-RAM, however, since a data recording area and an address area are provided in a track, format efficiency is not good, and this causes waste of a data recording area. In order to cope with this problem, PTL 1 discloses a technique with which address information is recorded by wobblings of a groove track, and thus waste of a data recording area is not caused.

CITATION LIST

Patent Literature

PTL1: WO 2013/140756

SUMMARY

In conventional techniques, when recording density has been improved and thus a recording capacity of an optical disk has increased, information recorded on the optical disk in advance has been changed. A device that records or plays back data on or from an optical disk has read recorded information in advance so as to specify a recording capacity.

In this method, however, every time when a recording capacity of an optical disk is changed, information recorded in advance should be changed. That is, manufacturing and management of optical disks becomes more complicated according as optical disks having different recording capacities increases.

The present disclosure in this application provides an optical disk such that a plurality of recording capacities can be realized in single optical disk. Further, the present disclosure provides a device that performs recording and playback on such an optical disk.

An optical disk of the present disclosure includes a disk management information area in which predetermined information is recorded in advance, and a recording system area in which information for identifying a recording system of the optical disk is recorded. A method for accessing the optical disk is decided based on the disk management information and the information for identifying the recording system.

An optical disk playback device of the present disclosure includes a burst cutting area (BCA) playback circuit that reads disk management information recorded on an optical disk in advance, a storage that stores disk information which is information about a disk related to the disk management information, and a system controller that acquires the disk information and information for identifying a recording system of the optical disk recorded in a predetermined position within a non-data area included in a recordable area of the optical disk, and decides a method for accessing the optical disk.

The optical disk recording device of the present disclosure includes a burst cutting area (BCA) playback circuit that reads disk management information recorded on an optical disk in advance, a storage that stores disk information which is information about a disk related to the disk management information, and a system controller that makes control such that information for identifying a recording system of the optical disk is recorded in a predetermined position within a non-data area included in a recordable area of the optical disk in accordance with a method for accessing the optical disk decided based on the disk information.

With an optical disk, an optical disk recording device, and an optical disk playback device disclosed in this application, single optical disk can achieve a plurality of recording capacities.

DETAILED DESCRIPTION

An exemplary embodiment will be described herein in detail with reference to the drawings appropriately. However, excessively detailed description may be sometimes omitted. For example, in some cases, detailed description of already well-known items and repeated description with respect to substantially the same configuration will be omitted. The reason for this is to avoid description below from being unnecessarily redundancy and to make those skilled in the art to easily understand.

Note that the attached drawings and the following description are provided for those skilled in the art to fully understand the present disclosure, and are not intended to limit the subject matter as described in the appended claims.

First Exemplary Embodiment 1-1. Configuration

Figure 1:
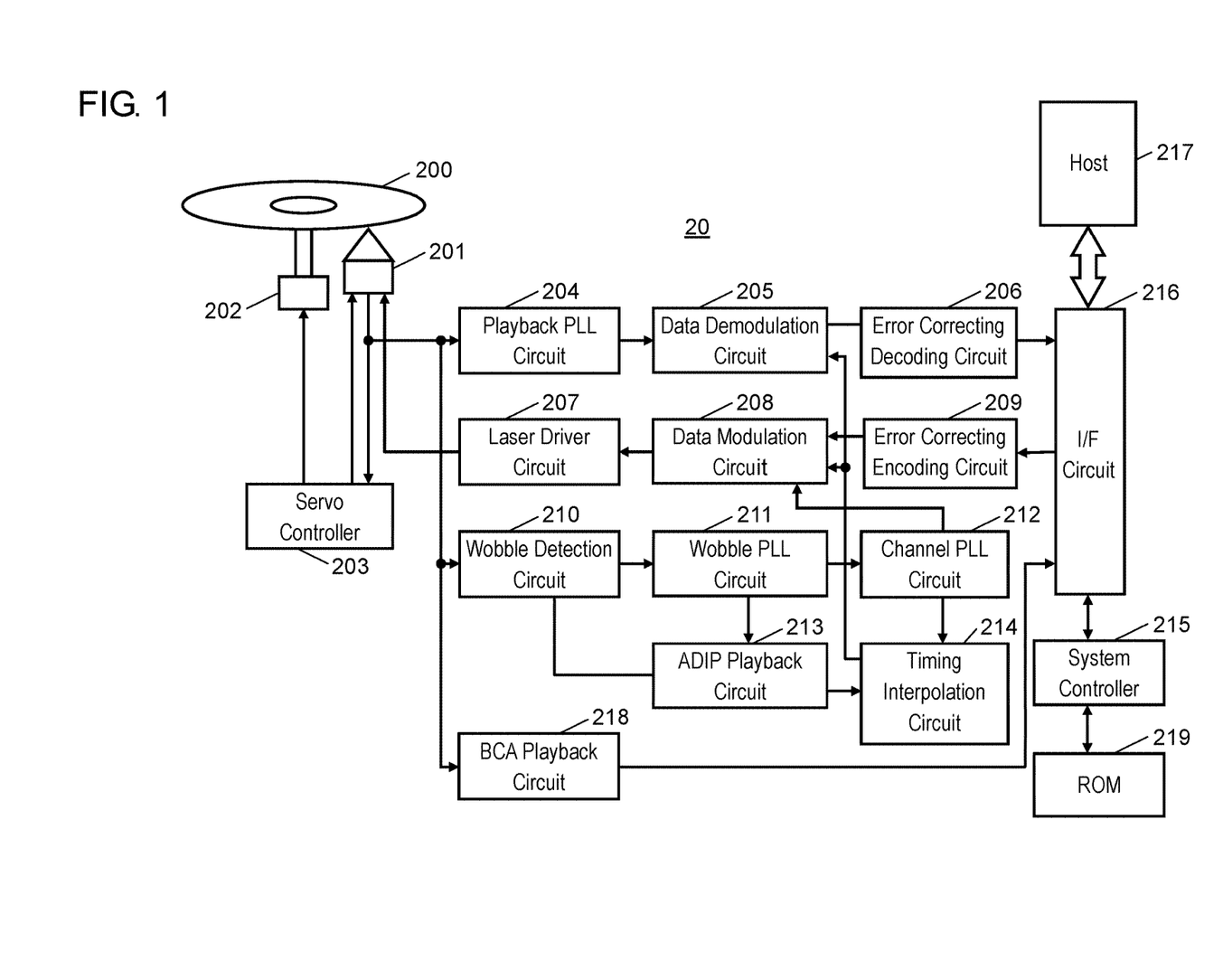
FIG. 1 is a diagram illustrating a configuration of an optical disk device.

FIG. 1 is a diagram illustrating a configuration of an optical disk device of the present disclosure. Optical disk device 20 illustrated in FIG. 1 includes optical head 201, spindle motor 202, servo controller 203, playback phase locked loop (PLL) circuit 204, data demodulation circuit 205, error correcting decoding circuit 206, laser driver circuit 207, data modulation circuit 208, error correction encoding circuit 209, burst cutting area (BCA) playback circuit 218, wobble detection circuit 210, wobble PLL circuit 211, channel PLL circuit 212, address in pre-groove (ADIP) playback circuit 213, timing interpolation circuit 214, system controller 215, interface (I/F) circuit 216, and read only memory (ROM) 219 (storage).

Optical disk device 20 records/plays back data on/from optical disk 200. Tracks are formed on an inner radius to an outer radius of optical disk 200 in a spiral form. The tracks include groove tracks formed by grooves, and land tracks formed between adjacent groove tracks. Data can be recorded on any groove tracks and any land tracks.

Figure 2:
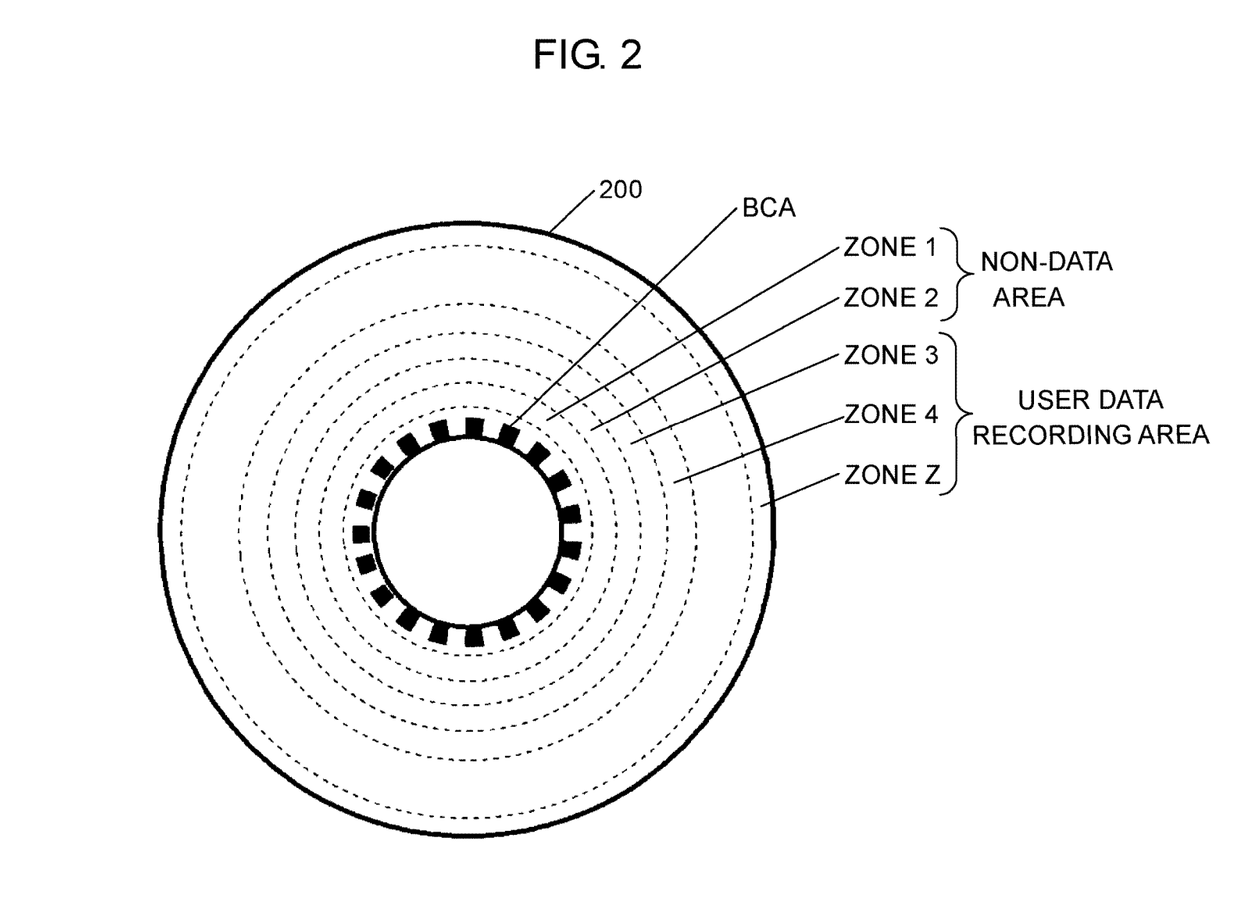
FIG. 2 is a diagram illustrating zones of an optical disk.

FIG. 2 is a diagram illustrating zones of an optical disk according to the present exemplary embodiment. A recording surface of optical disk 200 includes BCAs and a recordable area in this order from the inner radius. Disk management information specific to a disk, such as a disk number, a number of disk layers, and a zone format identification number of optical disk 200 are recorded in the BCAs. The zone format identification number is an identifier that represents a type of a format of data to be recorded on optical disk 200. The recordable area is divided into Z (Z: a natural number of 2 or more) zones in a radial direction. Optical disk device 20 sets a frequency of a recording clock or a recording speed (a linear speed) for each of the plurality of zones.

The recordable area of optical disk 200 is further divided into a non-data area and a user data recording area. For example, inner zones 1 and 2 are allocated to the non-data area, and zones 3 to Z are allocated to the user data area.

The non-data area includes, for example, an area where recording adjustment is made such that a laser output from optical head 201 by laser driver circuit 207 is appropriately adjusted, an area where servo adjustment is made such that a light beam emitted from optical head 201 onto optical disk 200 is appropriately concentrated on a groove track or a land track provided onto optical disk 200 and scans a track, a data management area where a use condition of the user data area and a defective portion such as a damaged portion of optical disk 200 are managed, and information for identifying a recording system in the user data area.

The user data area is an area where user data requested to be recorded from host 217 is recorded.

The tracks are wobbled to be formed in a spatial period (wavelength) proportional to a radial position of optical disk 200. A central angle of optical disk 200 corresponding to the spatial period of the track wobblings is constant regardless of a radial position. In other words, the spatial period of wobblings is longer in proportion to the radial position, namely longer toward an outer edge. Therefore, the track wobblings are configured radially.

When recording is performed on an entire surface of optical disk 200 in synchronization with the spatial period of wobblings, linear density of a recording pattern is lower toward the outer edge and thus a recording capacity of optical disk 200 decreases. Therefore, optical disk device 20 according to this exemplary embodiment changes a ratio of a unit length of data to the spatial period of wobblings in accordance with a radius, namely, changes a length of one bit of a recording pattern to be recorded on an optical disk. As a result, the linear density can be approximately constant over the entire surface.

Address in pre-groove (ADIP) information having address information of tracks on optical disk 200 is modulated and embedded into track wobblings. Each of tracks of optical disk 200 is divided by a constant angle obtained by equally dividing one period into seven regardless of the radial position. One piece of ADIP information is embedded into each of the divided tracks. Since the central angle corresponding to the spatial period of track wobblings on optical disk 200 is constant regardless of the radial position, a number of wobblings included in each of the equally divided seven tracks (a number of wobblings for one wavelength) is constant regardless of the radial position. That is, a number of wavelengths for wobblings corresponding to single piece of ADIP information is constant regardless of the radial position.

Spindle motor 202 rotates optical disk 200. Optical head 201 records data on optical disk 200 and plays back data from optical disk 200.

Servo controller 203 controls optical head 201 and spindle motor 202. Servo controller 203 makes control such that a light beam emitted from optical head 201 onto optical disk 200 is concentrated onto a track provided to optical disk 200 and scans the track. Servo controller 203 controls a movement such that a target track is accessed. Servo controller 203 controls a position of optical head 201 and a rotation speed of spindle motor 202 such that optical head 201 scans optical disk 200 at a constant linear speed.

I/F circuit 216 receives recording data to be recorded on optical disk 200 from host 217, and sends playback data played back from optical disk 200 to host 217.

Error correction encoding circuit 209 adds a parity for correcting an error to the recording data received from I/F circuit 216.

Wobble detection circuit 210 extracts a wobble signal based on a (temporal) period of track wobblings from a playback signal from optical disk 200. Optical disk 200 rotates with respect to optical head 201. For this reason, a position of a track in a radial direction opposing optical head 201 periodically shifts in accordance with a spatial period of the track wobblings and a linear speed on the track of optical disk 200. Wobble detection circuit 210 detects this periodical shift as a waveform, and outputs the periodical shift as a wobble signal. When optical disk 200 rotates at a constant linear speed, a frequency of the wobble signal becomes higher on a track closer to a center of optical disk 200.

Wobble PLL circuit 211 generates a pulse signal corresponding to a frequency of the wobble signal, and multiplies a frequency of the pulse signal by a predetermined magnification to generate a wobble clock. A frequency of the wobble clock (a number of pulses per unit time) is proportional to the spatial period of the track wobblings. Further, a number of pulses of a wobble clock corresponding to single piece of the ADIP information is constant regardless of the radial position.

ADIP playback circuit 213 plays back the ADIP information from the wobble signal and the wobble clock.

Channel PLL circuit 212 synchronizes with a phase of the wobble clock, and generates a recording clock whose frequency becomes n/m (m, n are natural values) times as high as the frequency of the wobble clock. The value n/m is a ratio of a bit number of a bit pattern of recording data to the spatial period (one wavelength) of wobblings, and is set in each zone of optical disk 200. Values m, n are included in a zone table and are decided in advance. Values m, n and n/m are examples of information relating to the linear density of data in each zone. The values m, n are notified by system controller 215.

The zone table will be described herein. The zone table contains information about each zone of an optical disk on which optical disk device 20 can perform recording and playback. For example, a zone table for optical disk 200 contains values of a zone number, m, n, ADIP reference position Pwo, start end data block reference position Pm for each of zones 1 to Z. ADIP reference position Pwo and start end data block reference position Pm will be described later. The zone table for optical disk 200 is associated with a zone format identification number related to optical disk 200. Such a zone table for each format of the optical disk on which optical disk device 20 can perform recording and playback is stored in ROM 219 (storage).

System controller 215 further reads information for identifying the recording system in the user data area. This information is recorded in the non-data area of optical disk 200. The information for identifying the recording system in the user data area is specifically information for altering values m, n set in each zone. When the information for identifying the recording system in the user data area indicates none, namely, when the information indicates operating according to references, system controller 215 accesses a predetermined zone using m, n stored in ROM 219. When the information for identifying the recording system in the user data area indicates alternation of m, n, system controller 215 decides m, n stored in ROM 219 as references, and reads values obtained by altering the references from ROM 219. System controller 215 accesses a predetermined zone using the read values.

The altered values in this case are obtained when a frequency of the recording clock being n/m times as high as the frequency of the wobble clock is further heightened by a few percent, for example. This means when the frequency of the recording clock is heightened, linear density when data is recorded on optical disk 200 is heightened. As a result, the recording capacity of optical disk 200 increases. A number of types of values to be altered is not limited to one. Contents to be altered may vary in accordance with plural types of contents as long as the information for identifying the recording system enables identification of the plural types of contents. For example, the frequency may be heightened (the linear density is heightened) by 5% in a first case, the frequency may be heightened by 10% in a second case, and the frequency may be heightened by 15% in a third case.

The description has exemplified a type of linear density (heightening of linear density) at a time of data recording as a changed content of an access method, but the changed content of the present disclosure described in this exemplary embodiment is not limited to the type of the linear density. The method for accessing the disk may be changed by using other methods. An example of other methods includes changing a ratio between the user data area and the non-data area, in the recordable area of optical disk 200. The access method may be changed for optical disk 200 entirely or for a part of optical disk 200. For example, the access method may be changed only for a specific zone or for a specific recording layer of optical disk 200.

The information for identifying the recording system in the user data area of optical disk 200 is recorded in the non-data area. More preferably, the information is recorded in one specific track or a plurality of specific tracks in the non-data area. When the information for identifying the recording system is recorded in a predetermined specific track, optical disk device 20 can acquire the information comparatively easily.

The information for identifying the system for recording in the user data area may be recorded as logical information or as a more physical signal level. When the information is recorded as the logical information, more detailed settings can be performed in accordance with an amount of information to be recorded in single track or a plurality of tracks. However, in order to read the identification information as the logical information, access to optical disk 200 should be appropriately selected. For example, in the above example, the linear density of data recorded in the track should be appropriately selected. For this reason, when the access method is not yet decided, it might be difficult to read the data.

Even when the access method is not appropriately selected, the system for recording the information as the physical signal can be determined based on whether an optical signal is recorded in a specific track. Whether a signal is present may be determined by a track unit. Thus, even when the linear density of optical disk 200 is not determined, whether the signal is present can be identified based on, for example, whether an optical signal read from a specific track is periodically swung or is not changed. In this case, an amount of information is less than that of the above logical information. In order to cope with this problem, a plurality of tracks is used, and single track is regarded as corresponding to one bit of a binary scale. In such a manner, the amount of information can be increased. In this case, an amount of information that is obtained by raising two to the power of (a number of tracks) can be secured.

When the information for identifying the recording system is recorded as the physical signal, it is more desirable to record signals successively only on a predetermined percentage of single track and to provide a predetermined non-signal section between this track and a next track than to record signals in an entire track. That is, physical signals corresponding to the information for identifying the recording system are recorded in a predetermined percentage of a continuous area of entire single track ranging, for example, from 70% to 85% inclusive. As a result, a sectioning position between tracks when a plurality of tracks is used can be easily discriminated.

Timing interpolation circuit 214 specifies positions where recording data is recorded and played back based on the ADIP information and the values n, m notified from system controller 215.

Data modulation circuit 208 synchronizes with the recording clock generated by channel PLL circuit 212, and modulates recording data including the parity from error correction encoding circuit 209 in accordance with a predetermined modulation rule on a position specified by timing interpolation circuit 214. As a result, the recording data is converted into a recording pattern to be recorded on optical disk 200.

Laser driver circuit 207 converts the recording pattern into a light wave pulse in order to accurately form a mark on optical disk 200, and drives a laser of optical head 201. Data modulation circuit 208, laser driver circuit 207, and optical head 201 are collectively defined as a recording unit.

In such a manner, the recording pattern generated by data modulation circuit 208 is recorded on optical disk 200 based on the recording clock. As describe above, the frequency of the recording clock is n/m times as high as the frequency of the wobble clock. Therefore, a length of one bit of the recording pattern with respect to the spatial period of the track wobblings is decided by a ratio n/m. That is, when value n is increased or value m is decreased, the length of one bit of the recording pattern to be recorded on optical disk 200 becomes short, and thus the linear density can be high. The spatial period of the wobble clock is longer toward the outer edge depending on the radial position of optical disk 200. For this reason, when values m and n are set such that n/m becomes large in accordance with the radial position, the linear density of the recording pattern on optical disk 200 can be constant. In optical disk device 20 according to this exemplary embodiment, values m, n are set for each zone of optical disk 200. When m and n are set for each zone such that n/m becomes larger toward a zone closer to the outer edge (a zone with larger zone number), the linear density of the recording pattern on optical disk 200 can be approximately constant. In other words, a range of the linear density of the recording pattern is enabled to fall within a constant range.

Playback PLL circuit 204 extracts, from a playback signal, a synchronous clock for demodulating the playback signal from optical disk 200.

Data demodulation circuit 205 demodulates recorded data from the playback signal in accordance with a position specified by timing interpolation circuit 214. Specifically, after a comparison of signal amplitude between a playback signal and an expected value waveform, data demodulation circuit 205 selects an expected value waveform whose signal amplitude is the closest to the signal amplitude of the playback signal, and selects data that is a source of the expected value waveform as a demodulated result.

Error correcting decoding circuit 206 corrects an error of the demodulated data to restore the data.

ROM 219 is formed with a flash memory. ROM 219 stores a program used by system controller 215 to control entire optical disk device 20. Further, ROM 219 stores a plurality of zone tables (described later), information about a disk related to the disk management information, and the like.

BCA playback circuit 218 plays back the stored disk management information from a playback signal obtained by playing back the BCA.

System controller 215 reads and executes the program stored in ROM 219 to control each block and also communication with host 217. System controller 215 reads values m, n related to a zone including a recording and playback target position from a zone table, and notifies channel PLL circuit 212 and timing interpolation circuit 214 of the values. System controller 215 controls each block of optical disk device 20 such that data is recorded based on a recording clock generated by channel PLL circuit 212 and a recording position specified by timing interpolation circuit 214. Data modulation circuit 208, laser driver circuit 207, and optical head 201 record data based on the recording clock and the recording position.

1-2. Operation

Operation of optical disk device 20 according to this exemplary embodiment to which optical disk 200 is mounted will be first described. When optical disk 200 is mounted to optical disk device 20, BCA playback circuit 218 first plays back the BCA recorded on optical disk 200 to acquire the disk management information. System controller 215 receives the disk management information from BCA playback circuit 218, and extracts a zone format identification number from the disk management information. System controller 215 specifies a zone table associated with the zone format identification number from the zone tables stored in ROM 219 (storage) and reads the specified zone table.

Recording operation of optical disk device 20 according to this exemplary embodiment will be described below.

System controller 215 decides information for identifying the recording system on optical disk 200 based on the zone table acquired from ROM 219 (storage) in accordance with the decided method for accessing optical disk 200. System controller 215 records a signal corresponding to the information on single predetermined track or a plurality of predetermined tracks in the non-data area. In the following description, based on this decision, the wobble clock is subject to m' division, and the recording clock is subject to n' division.

I/F circuit 216 acquires the recording data and a logical address of a recording destination sent from host 217. The recording data is divided into blocks of a predetermined unit, and each of the blocks is sent to error correction encoding circuit 209. Error correction encoding circuit 209 adds a parity code for correcting an error at a time of playback to the recording data of a block unit. Data modulation circuit 208 modulates the recording data, to which the parity code is added, into a recording pattern in accordance with, for example, a modulation rule of 1-7PP code. Laser driver circuit 207 converts the recording pattern, which has modulated into recording mark 2T to recording mark 9T and a space by the 1-7PP code, into a castle type pulse waveform in order to accurately form the recording marks on optical disk 200. Laser driver circuit 207 then outputs a drive signal for driving the laser to optical head 201. Optical head 201 emits a laser pulse to a position on optical disk 200 related to the logical address of the recording destination, and thus records the recording pattern.

Optical disk 200 is configured such that ADIPs are provided in it, in a radial manner. For this reason, optical disk device 20 controls the recording clock for recording data such that the linear density of the recording pattern in a recording surface of optical disk 200 is approximately constant. Channel PLL circuit 212 controls the recording clock. Wobble detection circuit 210 detects the wobble signal according to the track wobblings. Wobble PLL circuit 211 generates the wobble clock that is synchronous with the wobble signal. Channel PLL circuit 212 operates such that a phase of a clock obtained by performing m' division to the wobble clock is synchronous with a phase of a clock obtained by performing n' division to the recording clock. As a result, channel PLL circuit 212 generates a recording clock whose frequency is n'/m' times as high as the wobble clock.

System controller 215 controls the above recording operation. System controller 215 first specifies, based on the logical address of the recording destination acquired by I/F circuit 216, a data address on which recording data is recorded, a track containing this data address (a groove track or a land track), and a zone. The data address is a physical address on optical disk 200 decided based on the ADIPs. The data address is used for specifying a recording and playback position of the recording data. System controller 215 refers to a zone table with a zone number and information for identifying the recording system which are related to the specified zone, and acquires m', n', ADIP reference position Pwo, and start end data block reference position Pm.

Figure 3:
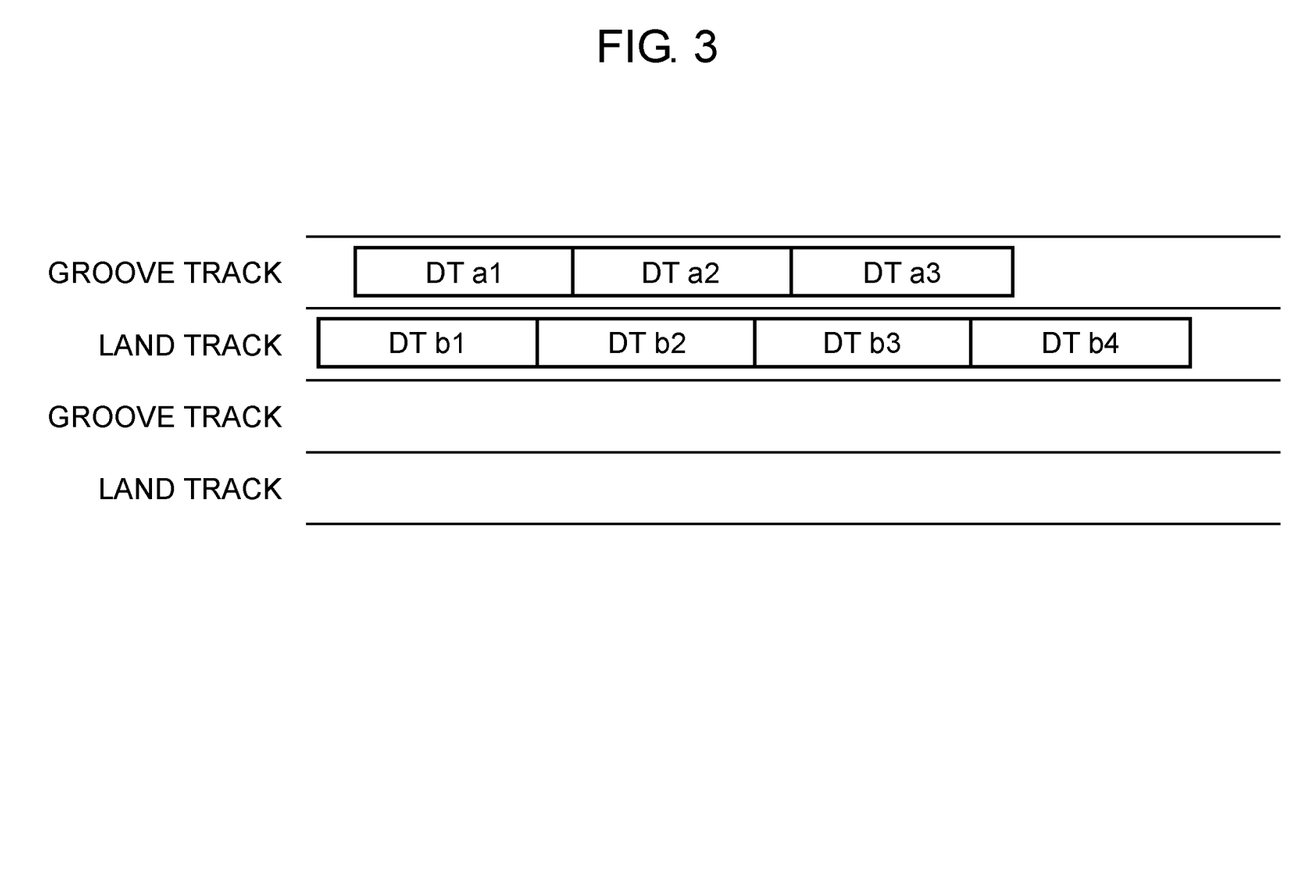
FIG. 3 is a diagram illustrating one example of a state that a plurality of blocks of recording data is recorded on the optical disk.

The recording data is divided into blocks, but a plurality of blocks relating to one recording data is continuously recorded on one of a groove track and a land track which are on the same layer. FIG. 3 is a diagram illustrating one example of a state that the plurality of blocks is recorded on the optical disk in this exemplary embodiment. FIG. 3 schematically illustrates tracks that are continuously disposed in a radial direction of optical disk 200. FIG. 3 illustrates that data has been divided into three and has been continuously recorded as DTa1, DTa2, and DTa3 on a groove track. Further, FIG. 3 illustrates that data b has been divided into four, and has been continuously recorded as DTb1, DTb2, DTb3, and DTb4 on a land track. When data is collectively recorded on the same track on the same layer in the above manner, a shift amount of the optical head 201 at a time of playing back the recording data might be small. The recording data can be thus read for a short time.

Figure 4:
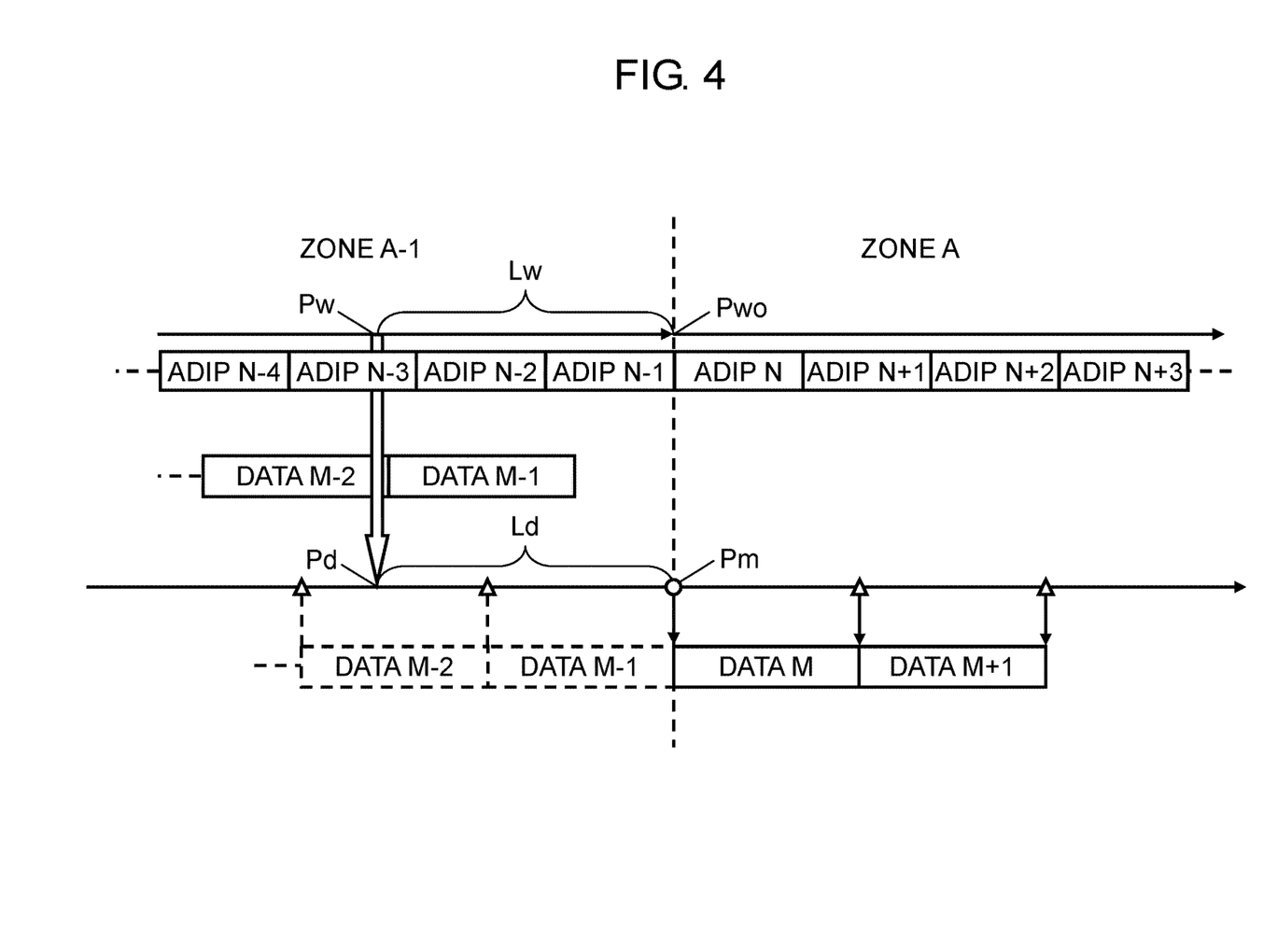
FIG. 4 is a diagram illustrating one example of arrangement structure of data and address on the optical disk.

FIG. 4 is a diagram illustrating one example of arrangement structure of data and addresses on the optical disk according to this exemplary embodiment. FIG. 4 schematically illustrates one example of an arrangement of the ADIP information and data blocks around a boundary between zones A-1 and A on tracks of optical disk 200. A top stage in FIG. 4 shows the ADIP information that is modulated and arranged by the track wobblings. A middle stage in FIG. 4 shows two data blocks recorded on a track included in zone A-1 of optical disk 200. A bottom stage in FIG. 4 shows two data blocks recorded in a track included in zone A adjacent to zone A-1. In zone A-1, a range of an address indicated by ADIP information arranged by the wobblings (hereinafter, simply described as ADIP) includes N−4, N−3, N−2, and N−1. In zone A, a range of the ADIP includes N, N+1, N+2, and N+3.

In FIG. 4, in zone A-1, a recording pattern is recorded in two continuous data blocks with data addresses M−2, M−1 (drawn by sold lines). In zone A, a recording pattern is recorded in two continuous data blocks with data addresses M, M+1 (drawn by sold lines). On a start position of zone A, boundaries match between a position indicated by N of the ADIP and a position indicated by data address M. Hereinafter, a data block with data address M is described also as data block M.

A recording start position of each zone is made to match with the boundary position of the ADIP. Different values n'/m' are decided for zone A-1 and zone A, respectively. A length of a zone does not become an integral multiple of a length of a data block. Therefore, as illustrated in FIG. 4, an area on which data is not recorded occasionally remains between a termination end of last data block M−1 in zone A-1 and a start end of zone A.

A case where recording is performed in data block M+2 next to data block M+1 in zone A will be described. Optical head 201 shifts a position to which the laser is emitted to a position short of a recording target position. Wobble detection circuit 210, wobble PLL circuit 211, and ADIP playback circuit 213 play back the ADIP information, and thus system controller 215 specifies a physical position on optical disk 200 opposing optical head 201.

Timing interpolation circuit 214 calculates distance Lw between the start end of zone A as ADIP reference position Pwo and current position Pw. Distance Lw is obtained by an equation: Lw=Pw−Pwo. Reference position Pwo and current position Pw on optical disk 200 can be specified with the wobble clock being a reference. For example, when the wobble clock is counted starting from an inner most periphery of the tracks of optical disk 200, each of reference position Pwo and current position Pw can be expressed as a number of pulses of the wobble clock. A position related to a head of the ADIP information is also included in the ADIP information as the number of pulses of the wobble clock. Therefore, reading of the ADIP information enables recognition of the current position on optical disk 200. Further, distance Lw is also obtained as the number of pulses of the wobble clock.

In addition, distance Ld is calculated by converting calculated distance Lw into a reference length of a block of the recording data. Distance Ld as a block unit reference of the recording data is obtained by an equation: Ld=Lw×n'/m'. As is understood from this equation, distance Ld is obtained as a number of pulses of the recording clock (or a number related to the number of pulses). A data block number at a head of zone A is M. When start end data block reference position Pm of zone A is a base point, current position Pd of a data block unit reference is obtained by an equation: Pd=Pm+Ld. Distance Ld, reference position Pm, and current position Pd can be specified by using the wobble clock as a reference. Start end data block reference position Pm in zone A is stored in a zone table of zone A. Current position Pd is obtained with a zone including the start end data block reference position being a reference. That is, even when the current position is included in zone A-1, the current position can be virtually obtained with zone A being a reference if a recording/playback target position is included in zone A. For example, when reference position Pm in zone A is a base point, positions of data blocks M−2, M−1 recorded in zone A-1 in a data block unit reference can be also calculated. On the bottom stage of FIG. 4, data blocks M−2, M−1 surrounded by broken lines represent virtual positions when reference position Pm in zone A is a base point. Even when a target position to be accessed is in zone A and the current position is in zone A-1 and is located across a boundary of the zone, use of virtual current position Pd prevents the data address from being discontinuous if the current position crosses the boundary of the zone. The virtual positions of data blocks M−2, M−1 obtained in such a manner is, however, different from actual positions of data blocks M−2, M−1 shown on the middle stage.

As described above, even when the current position is in zone A-1, current position Pd in the data block unit reference with the start end of zone A being a reference position can be obtained by using the ADIP information.

Channel PLL circuit 212 operates using a value n'/m' decided in zone A such that the phase of the clock obtained by performing m' division to the wobble clock is synchronous with the phase of the clock obtained by performing n' division to the recording clock. As a result, channel PLL circuit 212 generates the recording clock whose frequency is n'/m' times as high as the wobble clock.

Timing interpolation circuit 214 operates, based on specified data block unit reference current position Pd, a data timing interpolation counter using the generated recording clock, and can interpolate boundaries of a following data block with one-channel bit accuracy. When the data timing interpolation counter indicates a target position where data is recorded, data modulation circuit 208 and laser driver circuit 207 operate to start recording the data.

Figure 5:
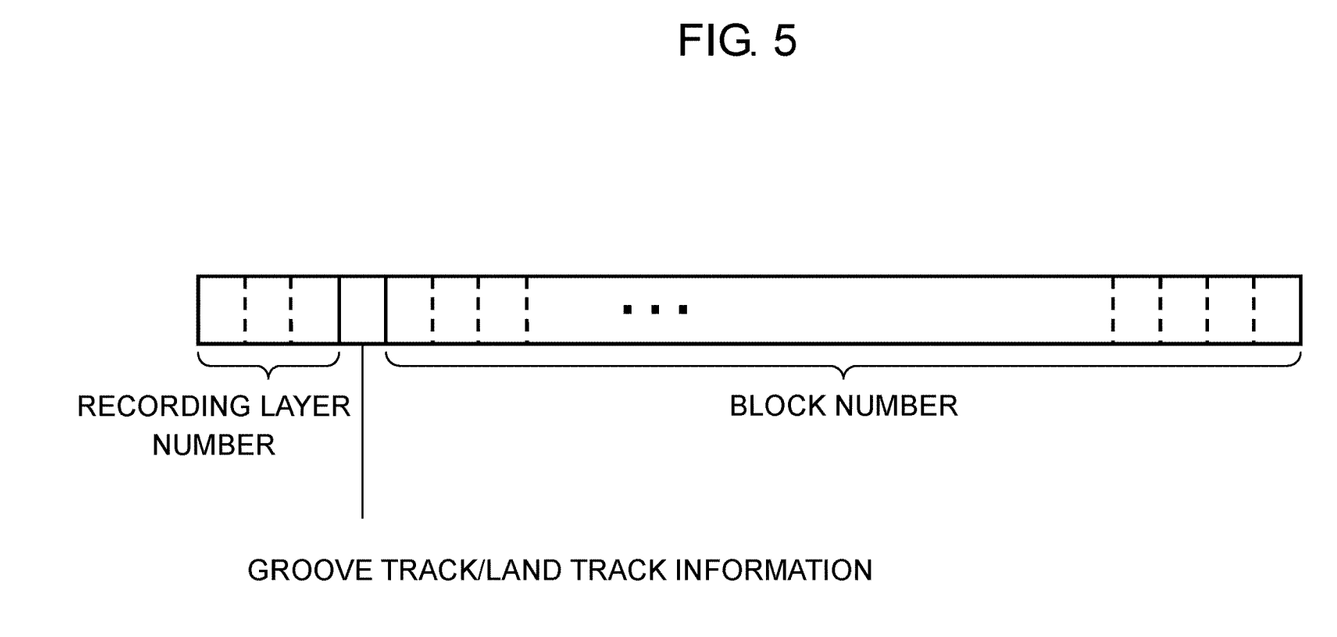
FIG. 5 is a diagram illustrating a configuration of a data address.

A data address is given to each data block of the recording data. FIG. 5 is a diagram illustrating a configuration of a data address according to this exemplary embodiment. A data address is formed with a recording layer number, a block number, and groove track/land track information. The recording layer number is information representing a recording layer number in which data is recorded, and the block number is information representing a block number of data. The groove track/land track information is information representing whether data is recorded in the land track or the groove track.

When data block M+2 is recorded, the data block number is M+2. Data modulation circuit 208 modulates recording data to which the data address is added, and laser driver circuit 207 and optical head 201 record the modulated data on a track of optical disk 200.

Playback operation of optical disk device 20 according to this exemplary embodiment will be described below.

An operation for specifying a playback position on optical disk 200 is similar to the operation for specifying a recording position in the recording operation. When timing interpolation circuit 214 makes the data timing interpolation counter indicate a position of a playback data block, playback PLL circuit 204, data demodulation circuit 205, and error correcting decoding circuit 206 operate to play back the data.

Positions where data is recorded and played back are decided by channel PLL circuit 212 and timing interpolation circuit 214. This operation is decided by a frequency ratio n'/m' between the wobble clock and the recording clock, and values of start end ADIP reference position Pwo and start end data block reference position Pm in each zone. After these values are uniquely decided, recording and playback should be performed.

Even if these values are slightly shifted, data cannot be played back. The above values are listed in accordance with each zone and thus the zone table is made as management information of optical disk 200. System controller 215 refers to ROM 219 (storage) and decides a method for accessing optical disk 200 based on the zone format identification number read from the BCA and the information for identifying the recording system read from a predetermined track in the non-data area. In the following description, system controller 215 makes the wobble clock be subject to m' division and the recording clock be subject to n' division.

Data can be recorded on optical disk 200 in this exemplary embodiment at any linear density according to each zone, and a common track format of optical disk 200 is used for any density of data to be recorded. However, for example, a material of a recording film of optical disk 200 is occasionally improved and modified such that data can be stably recorded at higher linear density, long-term preservability is further heightened, and a production cost is decreased. Such a modification changes the linear density which enables appropriate recording on the optical disk. The zone format identification number is recorded in the BCA that is not related to a track such that a track format can be uniform and at the same time appropriate linear density can be selected for the disk.

Since data can be recorded on optical disk 200 according to this exemplary embodiment at any linear density, the linear density can be decided such that, for example, recording capacity is 50 GB per layer in a case of zone format identification number 1, 60 GB per layer in a case of zone format identification number 2, and 80 GB per layer in a case of zone format identification number 3. The zone table is decided and used for each of the zone format identification numbers, and thus data can be recorded and played back.

In such a way, when the linear density varies greatly, accordingly a frequency characteristic of the playback signal varies. For this reason, signal processing systems of playback PLL circuit 204 and data demodulation circuit 205 should be greatly changed when data is played back. When optical disk device 20 has playback PLL circuit 204 and data demodulation circuit 205 that are compatible with linear density ranging from 50 GB to 80 GB per layer, optical disk device 20 reads the zone format identification number recorded in the BCA and accordingly refers to the zone table to securely play back data.

However, when optical disk device 20 does not have playback PLL circuit 204 and data demodulation circuit 205 that are compatible with linear density of 80 GB per layer, optical disk device 20 cannot play back data even if optical disk device 20 reads the zone format identification number recorded in the BCA and accordingly refers to the zone table. In order to prevent occurrence of such an error of data playback, data may be scrambled in a predetermined manner such that optical disk device 20 which is not compatible with linear density of 80 GB per layer cannot appropriately play back data in the BCA. When optical disk device 20 cannot appropriately play back data in the BCA, optical disk device 20 cannot read the zone format identification number and cannot refer to the zone table. For this reason, optical disk device 20 determines that optical disk 200 is incompatible before performing inappropriate recording and playback. Therefore, optical disk 200 can be protected.

The optical disk described in this exemplary embodiment has a disk management information area in which predetermined information is recorded in advance. The disk management information area contains, as the BCA, disk management information specific to the disk such as a disk number of an optical disk, a number of layers in the optical disk, and the zone format identification number. The optical disk further contains a recording system area in which the information for identifying the recording system of the optical disk is recorded. This area is included in, for example, the non-data area of the optical disk. The method for accessing the optical disk is decided based on the disk management information and the information for identifying the recording system recorded in the optical disk.

As a result, the system for recording data on the optical disk is decided by both the information defined by the disk management information and the information for identifying the recording system. Since the disk management information has been recorded in the disk in advance, this information cannot be changed. On the other hand, the information for identifying the recording system is recorded in the non-data area of the recordable area of the optical disk. Use of the information for identifying the recording system enables different settings for each optical disk.

Specifically, as described in this exemplary embodiment, the linear density is modified in accordance with information indicated by the information for identifying the recording system based on information defined by the disk management information and the like, and thus the recording capacity of the optical disk can be changed. As a result, differently from a conventional technique, different types of optical disks do not have to be manufactured and managed in accordance with different recording capacities of optical disks, and thus one type of physical optical disk can be made to be compatible with a plural types of recording capacities.

Further, as described in this exemplary embodiment, the information for identifying the recording system is recorded in the predetermined position of the optical disk, and thus the method for accessing the optical disk can be appropriately identified by a playback device for an optical disk.

This exemplary embodiment has described an optical disk, and an optical disk recording device and an optical disk playback device that record and playback data on and from the optical disk. However, the present disclosure described in this exemplary embodiment is not limited to them, and the present disclosure can be achieved also as a method for recording on an optical disk and a method for playing back from the optical disk. In this case, the present disclosure can be achieved as a method for controlling the above-described device.

The present disclosure is applicable to an optical disk on which data is optically recorded, and an optical disk device that records or plays back data on or from the optical disk.

What is claimed is:

1. An optical disk comprising:
   a burst cutting area (BCA) in which disk management information, including a reference linear density used in a recording system of the optical disk, is recorded; and
   a recordable area, which is in an area different from the burst cutting area, in which identification information, which is used for identifying the recording system of the optical disk together with the disk management information by calculating a linear density that is different from the reference linear density, is recorded.

2. The optical disk according to claim 1, wherein
   the recordable area includes a user data recording area for recording data, and a non-data area for recording information used for recording data, and
   the identification information is information to be recorded in a predetermined position within the non-data area.

3. The optical disk according to claim 2, wherein
the identification information is information to be recorded on single predetermined track or a plurality of predetermined tracks within the non-data area.
4. The optical disk according to claim 3, wherein
the identification information is information identified based on whether a signal to be recorded on the single predetermined track or the plurality of predetermined tracks by an optical method is present.
5. The optical disk according to claim 4, wherein
the signal to be recorded by the optical method is continuously recorded in a predetermined percentage or more of the single predetermined track.
6. The optical disk according to claim 1, wherein
the identification information represents a type of linear density of an optical signal to be recorded in a user data area in the recordable area.
7. An optical disk playback device comprising:
a burst cutting area (BCA) playback circuit that reads disk management information recorded in a burst cutting area on an optical disk in advance; and
a system controller that acquires identification information for identifying a recording system of the optical disk recorded in a predetermined position within a non-data area included in a recordable area, which is an area different from the burst cutting area, of the optical disk, and decides a method for accessing the optical disk based on the disk management information read out by the burst cutting area playback circuit and the identification information.
8. An optical disk recording device comprising:
a burst cutting area (BCA) playback circuit that reads disk management information recorded on an optical disk in advance; and
a system controller that performs control such that identification information for identifying a recording system of the optical disk is recorded in a predetermined position within a non-data area included in a recordable area, which is an area different from a burst cutting area, of the optical disk in accordance with a method for accessing the optical disk decided based on the disk management information read out by the burst cutting area playback circuit.

* * * * *